United States Patent
Chen et al.

(10) Patent No.: US 7,529,759 B2
(45) Date of Patent: May 5, 2009

(54) SYSTEM AND METHOD FOR BATCH OPERATION OF CMP BEANS

(75) Inventors: Michael Chen, Santa Clara, CA (US); Seth White, San Francisco, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 419 days.

(21) Appl. No.: 10/966,329

(22) Filed: Oct. 15, 2004

(65) Prior Publication Data

US 2005/0262072 A1    Nov. 24, 2005

Related U.S. Application Data

(60) Provisional application No. 60/573,217, filed on May 21, 2004.

(51) Int. Cl.
    *G06F 17/30* (2006.01)
(52) U.S. Cl. .................. 707/101; 707/102; 717/116; 711/118
(58) Field of Classification Search ............... 707/101, 707/102, 104.1; 717/116; 711/118
    See application file for complete search history.

(56) References Cited

U.S. PATENT DOCUMENTS

| | | | |
|---|---|---|---|
| 6,032,143 A * | 2/2000 | Leung et al. ................ 707/2 |
| 6,442,748 B1 * | 8/2002 | Bowman-Amuah ......... 717/108 |
| 6,502,102 B1 * | 12/2002 | Haswell et al. ............ 707/102 |
| 6,584,459 B1 * | 6/2003 | Chang et al. ................ 707/3 |
| 7,149,730 B2 * | 12/2006 | Mullins et al. ............... 707/2 |
| 2002/0133484 A1 * | 9/2002 | Chau et al. ................... 707/3 |
| 2003/0163460 A1 * | 8/2003 | Shinn et al. .................. 707/3 |
| 2004/0122802 A1 * | 6/2004 | Allen et al. .................. 707/3 |
| 2005/0183057 A1 * | 8/2005 | Barghouthi et al. ........ 717/100 |
| 2005/0240616 A1 * | 10/2005 | Alcorn et al. .............. 707/102 |

* cited by examiner

*Primary Examiner*—Leslie Wong
(74) *Attorney, Agent, or Firm*—Fliesler Meyer LLP

(57) ABSTRACT

A method and system are provided for storing multiple instances of a CMP bean enrolled in a transaction by utilizing CMP batch operations to update multiple entries in a database table in one SQL statement only, thus avoiding multiple database roundtrips. The batch operation of CMP beans can be enabled by specifying certain options in a DTD file. As part of the batch operation feature, another option may be added to the DTD file as well, enabling the container to delay all database operations in a transaction until the commit time, automatically sort the database dependency between the operations, and send these operations to the database in a way to avoid any potential database constraint violations.

20 Claims, 2 Drawing Sheets

SYSTEM AND METHOD FOR BATCH OPERATION OF CMP BEANS

CLAIM OF PRIORITY

This application claims priority from the following application, which is hereby incorporated by reference in its entirety:

U.S. Provisional Patent Application No. 60/573,217, entitled SYSTEM AND METHOD FOR BATCH OPERATION OF CMP BEANS by Michael Chen, et al., filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of batch operation on EJBs.

BACKGROUND

A container-managed software component relies on the container to perform persistent data access on behalf of the object of the component. Here the application component can be an instance of a programmable class (also referred to as class), which can be but is not limited to, a Java bean, an Enterprise Java Bean (EJB), an interface, a module, and other suitable concepts, and container-managed persistence (CMP) bean will be used to illustrate the various embodiments of the invention in the following context. An Enterprise Java Bean (EJB) is a server-side application component that encapsulates the business logic of an application. The instances of an EJB are created and managed at runtime by a container, which runs as part of an application server to provide enterprise applications with a high level of abstraction. A container-managed persistence (CMP) bean, especially an entity bean, relies on the container to perform persistent data access on behalf of the instances of the EJB. The container transfers data between an instance of a CMP bean and the underlying data source (such as a database) as a result of the execution of the methods of the EJB, such as SQL statements. On the contrary, a bean-managed persistence (BMP) bean relies on the own methods of the EJB to perform persistent data access on behalf of the instances of the BMP bean.

The CMP bean corresponds to a table in the underlying database while each instance of the CMP bean often corresponds to an entry in the table. Here, the database can be a relational database, an object-oriented database, a DB2, an Informix Database, an Oracle Database, an SQL Server, a Sybase Database, a Point Base, and an SQL Server2000, and other suitable database. Multiple instances of the same type of CMP bean are often modified and/or updated in a single transaction they are enrolled in. Sometimes, a transaction needs to update thousands of CMP bean instances, and causes thousands of database roundtrips as the result. Such process is not very efficient, and may become a performance bottleneck. Users would either have to suffer the performance consequence or use SQL statements directly to update entries in the database, neither approach is very desirable.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention improve the performance of storing multiple instances of the same type of CMP bean enrolled in a transaction by utilizing CMP batch operations to update multiple entries in a database table in one SQL statement only, thus avoiding multiple database roundtrips. Here, the term "batch operation" refers to database update for the follow SQL statements: "insert", "update", "delete", and other suitable statements. The batch operation of CMP beans can be enabled by specifying an <enable-batch-operations> option in a Document Type Definition (DTD) file such as weblogic-rdbms20-persistence-710.dtd, which is a specific document defining and constraining definitions or set of statements that follow the rules of XML. As part of the batch operation feature, a new option <order-database-operations> may be added to the DTD file as well, enabling the container to delay all database operations in a transaction until the commit time, automatically sort the database dependency between the operations, and send these operations to the database in a way to avoid any potential database constraint violations.

The following is a comparison study of database updates with and without the batch operation being enabled. In this scenario, "n" rows (ranging from 1 to 20) are updated to a table containing three columns. The update with batch results in one roundtrip, while the update without batch results in "n" roundtrips. The results shown in the table below are measured in milliseconds, and are averaged over 100 runs.

|  | Rows | | |
| --- | --- | --- | --- |
|  | 1 | 10 | 20 |
| Without Batch | 10.42 | 127 | 254 |
| With Batch | 10.61 | 26 | 32 |

As the results show, the time taken with batch operation enabled increases at a much slower pace than the time taken without batch, resulting in big performance improvements when a transaction is enrolling many CMP bean instances. On the other hand, updating a single row with batch causes less than 1% of performance degradation than without batch, indicating that batch operation should be used as default since the performance degradation is minimal even when only a single row is updated.

Figure 1:
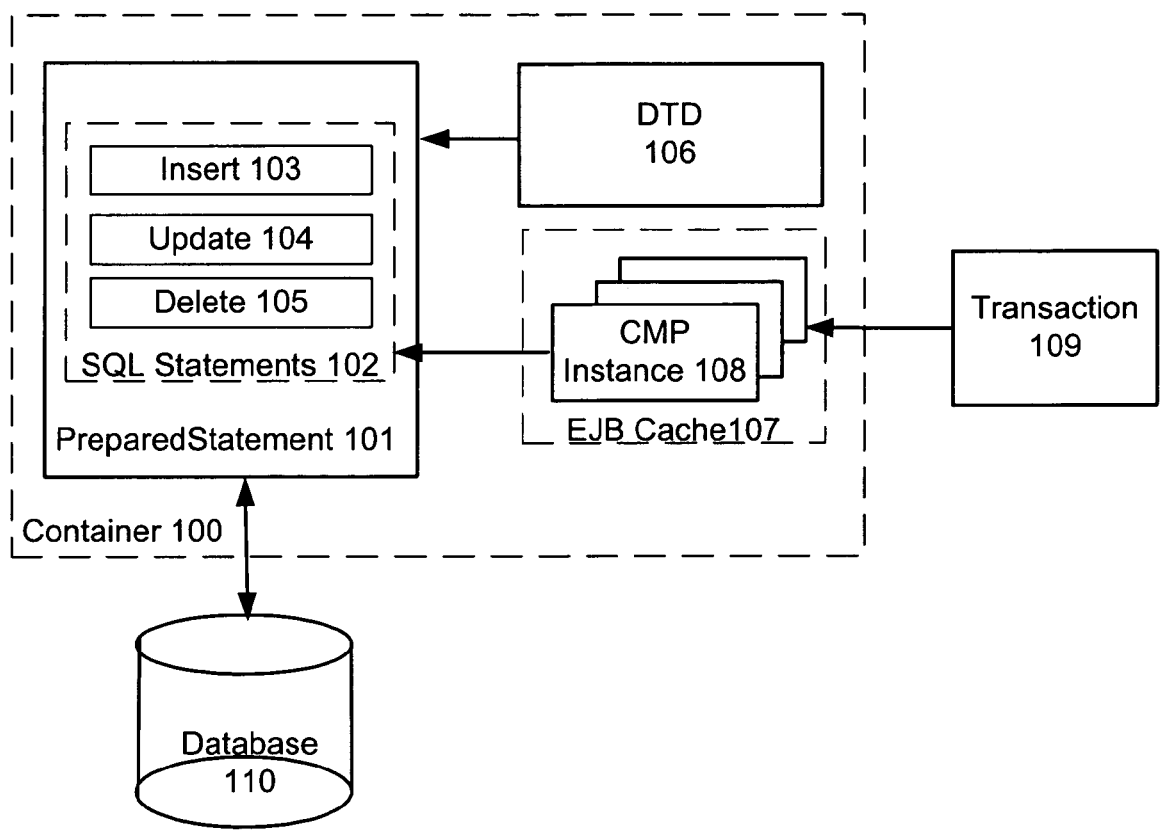
FIG. 1 is an illustration of an exemplary in accordance with one embodiment of the present invention.

FIG. 1 is an illustration of a system supporting batch operations for CMP beans in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an object called PreparedStatement 101 in a container 100 includes a list (batch) of SQL statements 102, each of which can be a type of one of: insert 103, update 104 and delete 105. The PreparedStatement is capable of generating the list of SQL statements based on the CMP instances 108 of the same type in a EJB instance cache 107, wherein these CMP instances are enrolled, modified and/or updated by a transaction 109. The PreparedStatement then adds those statements to a batch and executes the batch against an underlying database 110 to write multiple CMP bean instances to entries in a corresponding table in the database in one roundtrip. The database may feedback the result of the batch operation back to PreparedStatement. The batch operation features of the CMP beans can be enabled by a DTD file 106 with certain options activated.

Figure 2:
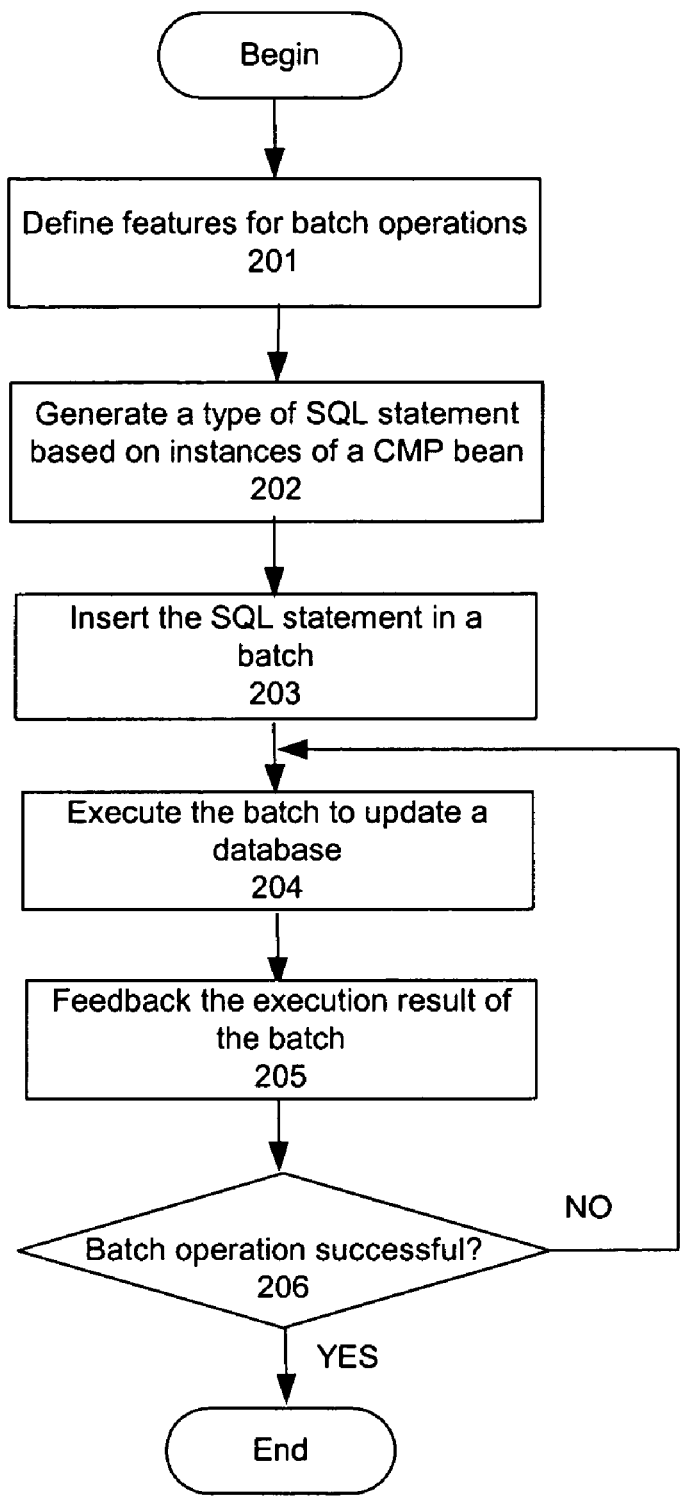
FIG. 2 is a flow chart illustrating a process in accordance with one embodiment of the present invention.

FIG. 2 is a flow chart illustrating an exemplary batch operation for CMP beans in accordance to one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, various features enabling batch operations of CMP beans are defined in DTD file at step 201. At step 202, an SQL statement of a certain type (insert, update, delete) can be generated based on the list of CMP instances that are enrolled, updated and/or modified by a transaction. Such SQL statement can then be inserted into a batch at step 203. The batch of SQL statements is then executed against a database at step 204, where each SQL statement updates multiple entries in a database table. The database may feedback the execution of the batch at step 205. If it is determined that the batch operation is not successful at step 206, the batch may be executed again at step 204.

In some embodiments, a Java object named PreparedStatement is utilized, representing one or more precompiled SQL statements that can then be used to efficiently execute these SQL statements multiple times as one batch. The setter methods (setShort, setString, and so on) in a PreparedStatement for setting IN values of input parameters must specify types that are compatible with the defined SQL type. For instance, if the IN parameter has SQL type INTEGER, then the setter method setInt should be used. If arbitrary parameter type conversions are required, the method setObject should be used with a target SQL type. In the following example of setting a parameter, con represents an active connection:

```
PreparedStatement pstmt = con.prepareStatement("UPDATE
    EMPLOYEES SET SALARY = ? WHERE
    ID = ?");
pstmt.setBigDecimal(1, 153833.00)
pstmt.setInt(2, 110592)
```

In some embodiments, batch operation (batching) features in the PreparedStatement, such as addBatch( ) and executeBatch( ) method are used to reduce the number of database roundtrips, both of the methods are implemented using an JDBC driver to the underlying database. A given SQL command (statement) is added to the list of commands in the current PreparedStatement object via addBatch( ). The commands in the list can then be executed as a batch by calling the method executeBatch( ). Note that batching features in the PreparedStatement is not supported by all JDBC drivers.

In some embodiments, once a batch of SQL commands is submitted to the underlying database for execution and if all of them execute successfully, an array of update counts will be returned. The int elements of the returned array are ordered to correspond to the commands in the batch, according to the order in which the commands were added to the batch. An element in the array returned by the method executeBatch( ) may be one of the following:

1. A number greater than or equal to zero — indicates that the command was executed successfully and is an update count giving the number of rows in the database that were affected by the execution of the command.
2. A value of SUCCESS_NO_INFO — indicates that the command was executed successfully but that the number of rows affected is unknown.

If one of the commands in the list of the batch fails to execute properly, executeBatch( ) throws a BatchUpdateException, and a JDBC driver may or may not continue to process the remaining commands in the batch. However, the behavior of the driver must be consistent with a particular DBMS, either always continuing to process commands or never continuing to process commands. If the driver continues processing after a failure, the array returned by the method BatchUpdateException.getUpdateCounts( ) will contain as many elements as there are commands in the batch, and at least one of the elements will be the following:

3. A value of EXECUTE_FAILED— indicates that the command failed to execute successfully, occurring only if a driver continues to process commands after a command fails.

In some embodiments, the CMP batch operation of a PreparedStatement only works when commands in the batch is the same SQL statement (for the same type of CMP bean) with different parameter values only. For the same type of CMP bean, it is possible to have maximum of three SQL commands, "insert", "update", and "delete". If all three of them are generated for a CMP bean, they will be executed in that order. Since a CMP batch operation may include all three SQL commands, three different type of SQL statements will be generated:

1. For "insert", the SQL statement contains the list of all of the fields that will be generated to make the database insert.
2. For "update", the SQL statement containing the union of all the changed fields will be generated by iteration through all modified instances of the CMP bean.
3. For "delete", the SQL statement containing the Primary Key (PK) field of the CMP bean instances will be generated to make database delete.

After the SQL statement is created, container will iterate though the list of modified instances of the CMP bean to set the values of the fields in the SQL statements, and add these statements to the batch via addBatch( ). For "update", the container will iterate the list of modified instances of the CMP bean twice to create a single SQL statement if the CMP bean having more than one field modified.

In some embodiments, different types of CMP beans will create different SQL statements in different batch operations if batch operations are enabled for a transaction enrolling multiple bean instances of different types of CMP beans. Instances of each CMP bean type may have maximum of three SQL statements in a batch, one for each type of SQL command. Each bean instance will set the values of the fields in its SQL statements to be executed in the batch.

In some embodiments, the batch operation applies only to changes within a transaction. The updates within a single transaction can be executed by one of:
1. Using a single server side method to wrap all entity bean method invocations, for example, a method to wrap all the entity bean method invocations.
2. Setting the transaction boundary explicitly.

In some embodiments, the total number of the instances modified in a batch operation can not exceed the limit on the maximum size of the cache holding instances of a certain type of CMP bean. Such limit can be the <max-beans-in-cache> attribute specified in the deployment descriptor of the container. Since a transaction can not enroll more than <max-bean-in-cache> number of CMP instances (otherwise, the transaction will be rolled back), the number of CMP bean instances in a batch can not exceed <max-bean-in-cache>.

In some embodiments, a new <enable-batch-operations> option is added to a DTD file such as weblogic-rdbms20-persistence-710.dtd to enable the container to perform batch operations and allow the update of multiple entries in a database table in one SQL statement.

<!ELEMENT enable-batch-operations (#PCDATA)>

The valid values of the option are "true", "True", "false" or "False" with "true" being the default value. If this option is set to true, the option of <order-database-operations> discussed below will be set to true automatically, and EJB container will delay all of the database operations in a transaction until the commit time.

In some embodiments, a new option <order-database-operations> is added to the weblogic-rdbms20-persistence-710.dtd too as part of the CMP batch operation feature.

<!ELEMENT order-database-operations (#PCDATA)>

The valid values of the option are "true", "True", "false" or "False" with "true" being the default value. This option is used for the container to delay all database operations by the SQL statements in the batch until the commit time of a transaction that enrolls the corresponding CMP instances, automatically sort the database dependency between the operations, and send these operations to database in such a way to avoid any database constraint errors, such as the Foreign Key (FK) constraint error.

Both <enable-batch-operations> and <order-database-operations> can be specified in the <weblogic-rdbms-jar> at Java Archive (JAR) level as follows:

```
<!ELEMENT weblogic-rdbms-jar (
    weblogic-rdbms-bean+,
    weblogic-rdbms-relation*,
    order-database-operations?,
    enable-batch-operations?,
    create-default-dbms-tables?,
    validate-db-schema-with?,
    database-type?
)>
```

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, class, method, type, interface, component, object model, and other suitable concepts. While the concept "instance" is used in the embodiments of the systems and methods described above, it will be evident that such concept can be interchangeably used with equivalent concepts such as, object, and other suitable concepts. While the concept "option" is used in the embodiments of the systems and methods described above, it will be evident that such concept can be interchangeably used with equivalent concepts such as, attribute, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented system to provide batch operation for container-managed components, comprising:
   a plurality of instances of a container-managed component;
   a database maintaining a table corresponding to the container-managed component;
   a batch of one or more SQL statements maintained in a container, wherein each of the one or more SQL statements to perform one of inserting, updating, and deleting operations against the database; and
   said container to
      generate an SQL statement based on the plurality of instances;

insert the SQL statement into the batch of the one or more SQL statements;
delay execution of the batch against the database until the commit time of the transaction; and
execute the batch against a plurality of entries in the table in the database; and
a DTD file to define one or more features of batch operations that are performed over the batch within said container,
wherein the number of instances in the plurality instances is bounded by the maximum size of the cache holding the plurality of instances, and wherein said container runs on one or more processors.

2. The system according to claim 1, wherein:
the container-managed component is a container-managed persistence (CMP) bean.

3. A computer-implemented system to provide batch operation for CMP beans, comprising:
a plurality of instances of a container-managed persistence (CMP) bean;
a database maintaining a table corresponding to the CMP bean;
a batch of one or more SQL statements maintained in a container, wherein each of the one or more SQL statements to perform one of inserting, updating, and deleting operations against the database; and
said container to
generate an SQL statement based on the plurality of instances;
insert the SQL statement into the batch of the one or more SQL statements;
delay the execution of the batch against the database until the commit time of the transaction; and
execute the batch against a plurality of entries in the table in the database; and
a DTD file to define one or more features of batch operations that are performed over the batch within said container,
wherein the number of instances in the plurality instances is bounded by the maximum size of the cache holding the plurality of instances, and wherein said container runs on one or more processors.

4. The system according to claim 3, wherein:
the plurality of instances are enrolled, modified or updated by a transaction.

5. The system according to claim 3, wherein:
the database is one of a relational database, an object-oriented database, a DB2, an Informix Database, an Oracle Database, an SQL Server, a Sybase Database, a Point Base, and an SQL Server2000.

6. The system according to claim 3, wherein:
the database further feeds back the execution result of the batch to the object.

7. The system according to claim 3, wherein:
the object can be a PreparedStatement.

8. The system according to claim 3, wherein:
a feature in the one or more features of the batch is to:
enable the operation of the batch;
sort automatically the database dependency between the one or more SQL statements in the batch; and
execute the batch against the database in such a way to avoid any database constraint error.

9. A computer-implemented method to provide batch operation for container-managed components, comprising:
maintaining a plurality of instances of a container-managed component in a cache, wherein the number of instances in the plurality instances is bounded by the maximum size of the cache holding the plurality of instances;
maintaining a table corresponding to the container-managed component in a database;
maintaining a batch of one or more SQL statements in an object;
generating an SQL statement based on the plurality of instances;
inserting the SQL statement into the batch of the one or more SQL statements;
delaying execution of the batch against the database until the commit time of the transaction;
executing the batch against a plurality of entries in the table in the database; and
defining one or more features of the batch operations that are performed over the batch in a DTD file within said container.

10. A computer-implemented method to provide batch operation for CMP beans, comprising:
maintaining a plurality of instances of a container-managed persistence (CMP) bean in a cache, wherein the number of instances in the plurality instances is bounded by the maximum size of the cache holding the plurality of instances;
maintaining a table corresponding to the CMP bean in a database;
maintaining a batch of one or more SQL statements in an object;
generating an SQL statement based on the plurality of instances;
inserting the SQL statement into the batch of the one or more SQL statements;
delaying execution of the batch against the data base until the commit time of the transaction;
executing the batch against a plurality of entries in the table in the database; and
defining one or more features of batch opertions that are performed over the batch in a DTD file within said container.

11. The method according to claim 10, further comprising:
enrolling, modifying or updating the plurality of instances via a transaction.

12. The method according to claim 10, further comprising:
feeding back the execution result of the batch from the database.

13. The method according to claim 10, wherein:
the SQL statement is to perform at least one of inserting, updating, and deleting operations against the database.

14. The method according to claim 10, wherein:
a feature in the one or more features of the batch is capable of one of:
enable the operation of the batch;
sort automatically the database dependency between the one or more SQL statements in the batch; or
execute the batch against the database in such a way to avoid any database constraint error.

15. A machine readable medium having instructions stored thereon that when executed cause a system to:
maintain a plurality of instances of a container-managed component in a cache, wherein the number of instances in the plurality instances is bounded by the maximum size of the cache holding the plurality of instances;
maintain a table corresponding to the container-managed component in a database;
maintain a batch of one or more SQL statements in an container;

generate an SQL statement based on the plurality of instances;

insert the SQL statement into the batch of the one or more SQL statements;

delay execution of the batch against the data base until the commit time of the transaction;

execute the batch against a plurality of entries in the table in the database; and define one or more features of batch opertions that are performed over the batch in a DTD file within said container.

16. A machine readable medium having instructions stored thereon that when executed cause a system to:

maintain a plurality of instances of a container-managed persistence (CMP) bean in a cache, wherein the number of instances in the plurality instances is bounded by the maximum size of the cache holding the plurality of instances;

maintain a table corresponding to the CMP bean in a database;

maintain a batch of one or more SQL statements in an container;

generate an SQL statement based on the plurality of instances;

insert the SQL statement into the batch of the one or more SQL statements;

delay execution of the batch against the database until the commit time of the transaction;

execute the batch against a plurality of entries in the table in the database; and define one or more features of batch opertions that are performed over the batch in a DTD file within said container.

17. The machine readable medium of claim 16, further comprising instructions that when executed cause the system to:

enroll, modify or update the plurality of instances via a transaction.

18. The machine readable medium of claim 16, further comprising instructions that when executed cause the system to:

feedback the execution result of the batch from the database.

19. The machine readable medium of claim 16, wherein:

the SQL statement is to perform at least one of inserting, updating, and deleting operations against the database.

20. The machine readable medium of claim 16, wherein:

a feature in the one or more features of the batch is to:

enable the operation of the batch;

sort automatically the database dependency between the one or more SQL statements in the batch; or execute the batch against the database in such a way to avoid any database constraint error.

* * * * *

UNITED STATES PATENT AND TRADEMARK OFFICE
CERTIFICATE OF CORRECTION

PATENT NO.         : 7,529,759 B2                                                    Page 1 of 1
APPLICATION NO.    : 10/966329
DATED              : May 5, 2009
INVENTOR(S)        : Michael Chen et al.

It is certified that error appears in the above-identified patent and that said Letters Patent is hereby corrected as shown below:

In column 1, line 12, delete "2004 ." and insert -- 2004. --, therefor.

In column 7, line 61, in claim 8, delete "and" and insert -- or --, therefor.

In column 8, lines 6-7, in claim 9, delete "an object;" and insert -- a container; --, therefor.

In column 8, line 16, in claim 9, after "of" delete "the".

In column 8, lines 28-29, in claim 10, delete "an object;" and insert -- a container; --, therefor.

In column 8, line 34, in claim 10, delete "data base" and insert -- database --, therefor.

In column 8, line 38, in claim 10, delete "opertions" and insert -- operations --, therefor.

In column 8, lines 51-52, in claim 14, delete "capable of one of:" and insert -- to: --, therefor.

In column 8, line 66, in claim 15, delete "an" and insert -- a --, therefor.

In column 9, line 5, in claim 15, delete "data base" and insert -- database --, therefor.

In column 9, line 9, in claim 15, delete "opertions" and insert -- operations --, therefor.

In column 9, line 21, in claim 16, delete "an" and insert -- a --, therefor.

In column 10, line 3, in claim 16, delete "opertions" and insert -- operations --, therefor.

Signed and Sealed this

Twenty-fifth Day of May, 2010

David J. Kappos
*Director of the United States Patent and Trademark Office*